United States Patent
Le Goc et al.

(10) Patent No.: US 6,560,585 B1
(45) Date of Patent: May 6, 2003

(54) PROCEDURE FOR CONTROLLING A COMPLEX DYNAMIC PROCESS

(75) Inventors: Marc Le Goc, Salon de Provence (FR); Michel Barles, Istres (FR); Norbert Dolenc, Cignac la Nerthe (FR); François-Marie Lesaffre, Istres (FR); Claude Thirion, Istres (FR)

(73) Assignee: Sollac, Puteaux (FR)

( * ) Notice: Subject to any disclaimer, the term of this patent is extended or adjusted under 35 U.S.C. 154(b) by 261 days.

(21) Appl. No.: 09/609,942

(22) Filed: Jul. 3, 2000

(30) Foreign Application Priority Data

Jul. 1, 1999 (FR) .......................................... 99 08417

(51) Int. Cl.[7] .............................................. G06F 15/18
(52) U.S. Cl. .............................. 706/23; 700/41; 700/42; 700/43
(58) Field of Search ..................... 600/429; 706/23; 700/41–43

(56) References Cited

U.S. PATENT DOCUMENTS

| | | | |
|---|---|---|---|
| 4,965,743 A | | 10/1990 | Malin et al. .................. 706/45 |
| 5,205,289 A | * | 4/1993 | Hardy et al. ................. 600/429 |
| 5,311,421 A | * | 5/1994 | Nomura et al. ............... 700/37 |
| 5,339,812 A | * | 8/1994 | Hardy et al. ................. 600/429 |
| 5,486,998 A | * | 1/1996 | Corso ........................... 700/32 |
| 5,570,282 A | * | 10/1996 | Hansen et al. ................ 700/41 |
| 5,592,622 A | * | 1/1997 | Isfeld et al. .................. 709/207 |
| 5,640,491 A | * | 6/1997 | Bhat et al. ..................... 706/25 |
| 5,659,667 A | * | 8/1997 | Buescher et al. ............. 706/23 |
| 5,704,011 A | * | 12/1997 | Hansen et al. ................ 706/25 |
| 5,774,633 A | * | 6/1998 | Baba et al. .................... 706/25 |
| 5,802,278 A | * | 9/1998 | Isfeld et al. .................. 709/249 |
| 5,828,835 A | * | 10/1998 | Isfeld et al. .................. 709/200 |
| 5,832,468 A | * | 11/1998 | Miller et al. .................. 706/23 |
| 5,943,662 A | * | 8/1999 | Baba et al. .................... 706/23 |
| 6,141,647 A | * | 10/2000 | Meijer et al. .................. 705/1 |
| 6,169,981 B1 | * | 1/2001 | Werbos ......................... 706/23 |

FOREIGN PATENT DOCUMENTS

| | | |
|---|---|---|
| WO | WO 97/50021 | 12/1997 |
| WO | WO 99/10758 | 3/1999 |

OTHER PUBLICATIONS

Robert A, Whiteside, Carmen M. Pancerella, and Paul A. Klevgard, A CORBA–Based Manufacturing Environment Proceeding of the Hawaii International Conference on System Sciences, Jan. 7–10, 1997, pps. 1–10.*

Gerti Kappel & Stefan Vieweg, Database Requirements for CIM Applications (1994) Information Management in Computer Integrated Manufacturing, pps. 1–23.*

* cited by examiner

*Primary Examiner*—John Follansbee
*Assistant Examiner*—Michael B. Holmes
(74) *Attorney, Agent, or Firm*—Oblon, Spivak, McClelland, Maier & Neustadt, P.C.

(57) ABSTRACT

A procedure for controlling a complex dynamic process. According to the procedure, information is periodically acquired and values of recorded quantities are generated. The condition and the evolution of the process are described by a succession of detected process phenomena. Each process phenomenon that is detected as a function of its own context is judged, which itself is described by other process phenomena. Then, bits of information are directed to operators only when the judgment has determined that they are necessary and timely in the given context to help to maintain or to return the process to its production goals.

20 Claims, 1 Drawing Sheet

PROCEDURE FOR CONTROLLING A COMPLEX DYNAMIC PROCESS

CROSS-REFERENCE TO RELATED APPLICATION

This document claims priority under 35 U.S.C. § 119 to French Patent Application No. 99 08 417 filed on Jul. 1, 1999, the entire contents of which are hereby incorporated herein by reference.

BACKGROUND OF THE INVENTION

1. Field of the Invention

The invention pertains to a procedure and equipment for carrying out a complex process which generally have a level of numerical command/control based on the so-called CIM (Computer Integrated Manufacturing) model.

2. Discussion of the Background

Such a procedure and equipment integrate traditional techniques which include: (1) the acquisition and the designation of numerical and symbolic data; (2) numerical computations; (3) signal processing and recognition of shapes; (4) artificial intelligence, especially of techniques for representation of indefinite, spatial, and temporal knowledge as rules of logic of first order predicates, as objects, and as reports, and associated reasoning techniques; (5) automatic control of continuous and/or discrete systems, in time and space; and (6) system control algorithms in real time.

In order to describe the state of a process and the evolution of the state of the process one calls on the following traditional definitions (1)–(12).

(1) A process is a system of transformation of an incoming flow and an outgoing flow of material, energy or information; in a system such as a blast furnace of a steel plant or a cement producing revolving oven, the process transforms the matter or energy.

(2) Such a system of transformation proceeds according to a large set of phenomena that are related to one another according to a common goal, which corresponds to the goals of production in an imperfect environment.

(3) The goal of production of the process can be expressed in terms of adherence to constraints which affect certain incoming flows and certain outgoing flows. These constraints can in turn be expressed in terms of specific aims or ranges of values. The aims pertaining to the incoming flows pertain for example to the position of the actuators of the process that the operator responsible for process behavior must respect, as, for example, in the case of a blast furnace, a minimum and maximum proportion of coal consumption, a minimum and maximum flow rate of oxygen, while the goals pertaining to the outgoing flows express some constraints pertaining to the output that the conduct operator must satisfy, which include for example a range of melt temperatures, a minimum daily flow rate of pig iron, a range of silicon content in the melt or the dross.

(4) The environment is called imperfect in the sense that it is defined in an imprecise, uncertain and incomplete way; this environment limits the production possibilities of the process.

(5) A model of behavior of a process is an organized set of knowledge, or a "body" of knowledge, which is used to predict the state of the system as a function of the value of recorded quantities of the system and, for example, values of parameter measurement of the model.

(6) A process is dynamic when the quantities which occur in its functioning model, like the state variables X, the input variables U, and the output variables Y, are related by temporal relationships.

(7) The behavior of one quantity can be defined by the relation between the value of its magnitude x and time t; it is then represented by x(t).

(8) According to the traditional rules defined by the entire set of the pairs of values (X'(t), X(t)) relative to each recorded quantity, where X' designates the derivative with respect to time t of the quantity X; the process can then be described by a relationship of the type:

$$X'(t)=f[\theta,X(t), U(t)] \text{ and } Y(t)=h[\theta, X(t), U(t)]$$

Where $\theta$ designates some parameters, t the time variable here continues, f [ ] and h [ ] some functions that describe the process.

(9) A trajectory of state of a process for a time interval $[\uparrow_{min}, \uparrow_{max}]$ is defined by a sequence of points (X'(t), X(t)) in which the values of t are included in this range.

(10) A dynamic process is complex in one or the other of the following cases: absence of mathematical model of behavior or mathematical model of inoperative behavior; absence of a physical model of behavior, due to the inadequacy of the scientific knowledge, for example, or inoperative behavior physical model which does not yield any exploitable numerical calculation algorithm, for example: a non-reversible model, a model that cannot be calculated, a model that results in prohibitive calculation times with respect to the required response time, and a chaotic model.

In the case of complex dynamic processes one therefore will generally use symbolic models that resemble the entire set of the knowledge bits and the expertise obtained from observation of the behavior of the process. In a traditional manner one can construct such a model of behavior from knowledge possessed by experts during conduct of the process in question, by employing: logical formalisms that allow one to represent this knowledge; methodological tools that allow the acquisition of the knowledge for the purpose of their representation; and techniques for solving problems that have been posed to automatically find solutions to problems expressed according to these formalisms.

Among the formalisms employed one can mention: (1) the representation of the descriptive knowledge in the form of objects, classes, and meta-classes; (2) the representation of deductive knowledge by a logic of the first order predicates; (3) the representation of temporal knowledge in the form a reified temporal logic; and (4) the representation of spatial and temporal knowledge in the form of charts of discrete events.

Among the problem solving techniques we can mention: (1) reasoning through the memory of properties and behaviors; (2) reasoning based on the logic of the first order predicates, of the so-called "Modus Ponens" type for example; (3) control of reasoning directed by the events, by the compilation of rules with trees of binary events for example; (4) management of time constraints; (5) signal processing by filtering, for example, by time and/or space segmentation, and by parametric identification; and (6) shape recognition, by multiple linear regression for example.

Among the methodological tools which allow the automatic exploitation of the knowledge we can mention system design methodologies with a knowledge base, such as the software product called "Openkads™" or methodologies that work out the generic knowledge bases such as KADS.

The dynamic character of the behavior model is obtained by the use of formalisms that integrate the temporal constraints, by including concepts of reports and events for example to the logic of the first order predicates. One known example of formalism of this kind is called "DEVS" (Discrete Event System Specification), which allows one to define what is called discrete events from the inputs U, from the state X, from the outputs Y of internal transition functions X→X, of the external transition functions U×X→X, of the output functions X×U→Y and of life duration functions of a state.

Figure 1:
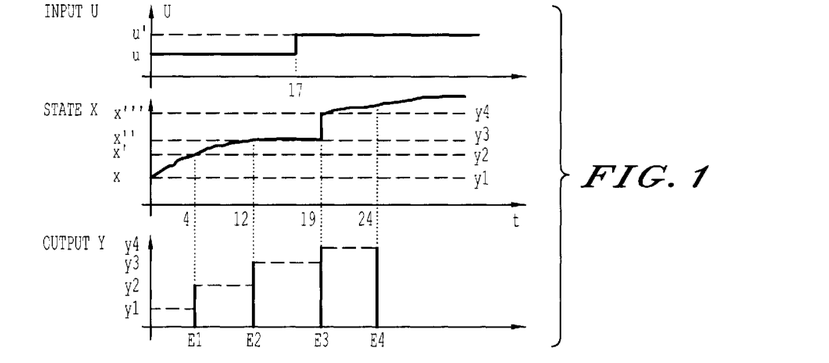
FIG. 1 shows a view with discrete events E1 to E4 of an input U-output Y relationship.

FIG. 1 shows such an abstraction with the discrete events E1 to E4 of an inputs U-outputs Y relationship.

In summary, the techniques for solving problems supply the technological and methodological tools that allow one to automate the exploitation of the knowledge that is used by experts to carry out a complex process and to translate these bits of knowledge into a behavioral model of the complex dynamic process.

As an example of a complex dynamic process we can mention: a blast furnace; an electric steel production oven; a glass production oven; a cement production oven; and, a rolled strip unit.

SUMMARY OF THE INVENTION

The present invention has a goal of providing a procedure and equipment capable of using this model of a complex dynamic process for the purpose of guiding the conduct of the process in conformity with the production goals of this process in an imperfect environment.

Fuzzy logic is a traditional means of using this kind of complex dynamic process model for the purpose of guiding the conduct of this process toward production goals, previously assigned or newly inserted. The fuzzy logic applied to this kind of model evaluates the level of adherence of the process state to one or several "symbolic values" of input of the model, deduces the "symbolic values" of corresponding outputs, and calculates the state of the system by weighting the output values as a function of the corresponding adherence levels.

Such a traditional means allows one to make the transitions between the different possible branches of reasoning on which the model is based more progressive.

But the disadvantage of such a means is that it leads one to neglect certain hypotheses of behavior of the process which can have, exceptionally or over the long term for example, very significant or catastrophic consequences, which may be very beneficial ones such that one thereby encounters phenomena that are rare but of exceptional importance.

Accordingly, one object of the present invention is to avoid such a disadvantage in the case of the use of complex dynamic process models.

In addition, from phenomena gathered on the basis of estimating the state of the complex dynamic process and its evolution in the course of time additional objectives are pursued.

One such additional objective is to give warning based on the "problematic" nature of the current behavior of the process by explaining the problem encountered.

Another such additional objective is to evaluate the "performance" of the process by reporting on the overall tendency toward improvement or degradation of the "outputs" of the process with respect to the goals being pursued.

Another such additional objective is to propose the commitment to correction actions for possible "problematic" or inadequately performing behaviors; the action commitment corresponds for example to changing the rules for actuators and/or to modifications of the "inputs" of the process.

For these reasons, the present invention has as an object a procedure for controlling a process based on information issued by the environment of the process and in order to send the information to the operators of the process of such a kind to help them to maintain or to return the process to its production goals.

The present invention knowing how to determine and furnish only "timely" messages allows one to avoid information saturation of the operators and allows them to devote their attention to the most pertinent information at the opportune moment in order to affect the process control.

The evolution of the quantities is integrated in the definition base of each process-phenomenon which is used to describe the evolution of the process and its operational context. In a space, called the state space, whose dimensions correspond to these quantities, the overall evolution of the process or its overall functioning context, which result form the evolution of the quantities, can then be represented by a trajectory whose projection onto each dimension will correspond to the evolution of each quantity.

While the criteria affect the value of the quantities they also implicitly define a "type" trajectory in the state space.

The invention can also present one or several of the following characteristics.

The description of the state of the evolution of the process and/or that of its functioning context includes reports of events, the definition of the events integrating that of one or several growth criteria of at least one recorded quantity and each event being assigned a date and/or a position, and each report being formed of a sequence of events ordered according to their date and/or their position. This additional characteristic completes the description of the state and of the process evolution and/or its context; in an advantageous way it can combine very different events and/or evolutions over time or at quite distant positions.

The previous definition of the process-phenomenon also integrates that of types of event reports.

This more complete definition allows one to identify developments over the long term and/or between very distant positions of the process which allow the operators of the process to control it by anticipating these developments. When used to describe the contexts it allows one to improve the judgment and to best select the information to send to the operators; the kinds of event reports are subsequently called "signal-phenomena".

The definition of the process-phenomenon and/or the events may also include that of one or several development criteria of the first derivative of at least one quantity with respect to a date and/or position variable, this derivative being a function of this variable.

If the evolution of the first derivative of the quantities is incorporated in the definition of certain process-phenomena and/or events according to the appropriate criteria for this additional characteristic of the invention, then one can represent the evolution of each quantity by a trajectory in a space that is appropriate for each quantity, in which the two dimensions correspond to this quantity and to its first derivative, and what is called the "phase space".

By means of the present invention the succession of detected process phenomena, which describes the state and development of the process and its functional context, can then include two representations: one in the form of a trajectory in the state space, and the other in the form of trajectories in the phase spaces.

One can therefore considerably improve the description of the state and evolution of the process because this more complete description of a process-phenomenon allows one, for example, to distinguish two phenomena that have the same trajectory in the state space but different trajectories in some phase spaces.

When used to describe the contexts, this additional characteristic of the invention also allows one to improve the judgment.

If the values of a quantity or, if necessary, of its first derivative are arranged according to the date and/or position variable to form a "signal", for the development criteria which affect the parameters calculated from this signal, to be observed only in a predetermined range of values of the variable, called the "analysis scale", the definition of each of the criteria is included in the classification of the calculated value of each parameter which the criterion will have in different predetermined sub-domains of the domain of values of this parameter, each sub-domain being defined by a lower limit and an upper limit.

If the parameter is the "identity" function and the analysis scale pertains to only one variable value, this definition of the criteria corresponds to partitioning of the state space (lower limit and upper limit for each sub-domain of values of a quantity) and to partitioning of the phase spaces (lower limit and upper limit for each sub-domain of values of a quantity and for each sub-domain of values of the first derivative of a quantity).

At least some of the criteria can be determined as a function of the production goals of the process, and the production goals can be reevaluated at each acquisition period of the information and the criteria is updated as a consequence.

By means of the present invention according to which, during each acquisition cycle, one reevaluates the production goals by, for example, updating the "aims" for every recorded quantity then one updates the criteria which define the phenomena, the control procedure automatically adjusts to the changes of conditions or of operating context of the process and the evolution of the process itself, with respect to its wear and tear and/or its aging for example.

Thus, the control procedure according to the invention is "reactive" in the sense that it is capable of reacting, in autonomous mode, to modifications of its environment.

In order to determine the criteria as a function of the production goals one can vary these limits as a function of these goals.

Finally, the present invention also has an objective of using the procedure according to the present invention to control a complex dynamic process, the process being chosen within the group that includes a blast furnace, a heat-treating furnace, such as a cement producing oven, a glass making oven or an iron slab oven, a unit with continuous metal flow, and a unit for rolled strip or continuous coating of a metal sheet.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

A general example of a complex process, control unit, and implementation of the present invention is now described.

The system to be controlled is provided with sensors or means to pick up the information that is necessary for evaluating the state of the process. In the case of a blast furnace this information includes, for example, the following: the temperature of the melt, of the gases in the throat and at the top of the tunnel, of the flame and walls, especially in the area of the staves, lips and refractory materials; the chemical composition of the throat gases, especially the content of $CO$, $CO_2$, $H_2$, $O_2$, that of the melt, especially the content of S, P, Si, Mn, Zn, that of the dross, especially the content of Fe, Mn, S, MgO, that of the oven materials, especially the content of $K_2O$ and of ferrous iron; the flow rate of total nitrogen and in the pipes, the oxygen flow rate, the temperature and the flow of the hot air, the flow of pulverized coal, and the cooling water flow; the weight of the loaded materials, especially the coke and the minerals, and the weight of the discharged materials, especially the melt and the dross; the speed of the gases in the throat, the level of the charges, the grain size of the loaded materials, especially the agglomerated materials; the pressure at the wall, and the wall differential pressure; and the duration of the castings, the duration of the castings without the dross.

The system to be controlled is equipped with actuators whose control values can be modified in order to cause the process state to evolve.

In the case of a blast furnace actuators can be provided as follows: actuators that allow one to modify the placement of the coke and the placement of the pulverized coal; an actuator that allows one to modify the overall flow of oxygen; actuators that allow one to modify the temperature of the hot stream and its moisture content; an actuator that allows one to modify the negative pressure in the throat; actuators that allow one to modify the amount of loaded materials, the chemical composition of the loaded materials, and the radial distribution of these materials; and actuators that allow one to modify the thickness of the layers, on which the weight of the melt loaded during a charging cycle will depend.

The control procedure according to the present invention links, in a cyclical and permanent way, two fundamental traditional functions (1), (2) as follows.

(1) To register, that is to estimate the state of functioning of the process from the "outputs" of the process, especially from the information supplied by the sensors.

(2) To control, that is to determine, the control value of the "inputs" or actuators of the process as a function of the recording of the process and in such a way to satisfy the production goals of the process. Satisfaction of the production goals maintains the process within the goals when they are already all satisfied, or returns the process to its intended purposes when at least one is not satisfied.

The control device according to the present invention can be called a "reactive rational agent". The word "agent" designates an autonomous device that includes: "inputs" arranged in the form of a set of information channels that allow the acquisition of information on the process and its environment; "outputs" arranged in the form of a set of actions that allow this agent to affect its environment; and production goals assigned to the process, organized in the form of a set of external goals that are also determined by the environment.

An agent is called "rational" if it selects effectively an action as soon as it becomes aware of the fact that this action can result in satisfying one of its external goals. In addition, a rational agent will not select any action if its external goals are satisfied. The means allowing the rational agent to apply the principle of rationality lies in what is called a body of knowledge pertaining to the functioning of the process. This means, here the body of knowledge, therefore is the link between the information channels, the external goals, and the actions. A rational agent is called "reactive" when it is capable of reacting in an autonomous way to the modifications of its environment.

Thus, in the mode of implementation of the control device according to the invention: (1) the information channels convey "messages" sent by the environment; (2) the external goals are divided up into "specific aims" and each "aim" is defined by a range of values that define a domain of evolution of the output flow of the process; and (3) the actions are included in the issuance of messages sent to the environment; these messages contain a description of the problems pertaining to the current situation with respect to the production specific aims and possibly advice on the conduct to pursue in order to solve these problems; they are accompanied by the necessary and sufficient information to "convince" the environment of the importance of the problems and the pertinence of the advice.

Thus, these messages that are sent to the environment, perform the following functions. They describe the state of the process and the possibly problematic nature of its development. They indicate, when this is possible and necessary, to the actuators whose settings are to be modified and the new control values being proposed. And, they supply, on demand of the process operators, explanations regarding the state of the process, the problem encountered, and the adjustments to be made.

The privileged recipients of these messages are therefore control operators of the process, whether one is dealing with automatic "hardware" operators or "personal" operators, that is humans.

Concerning the language and the syntax of the messages one should specify the following. That the messages sent by the environment are generally formatted in real numbers which generally represent the value of one physical quantity. That the arguments are then made in a symbolic space. That the messages next sent toward the environment are worded in a language adapted to the addressees: natural language, symbolic language, and/or phenomenological language, like sentences accompanied by charts, in the case when these addressees are people.

The device according to the present invention therefore ensures numerical to symbolic conversion.

The control device according to the present invention is therefore adapted to satisfy the specific production aims of the process, that is to help to maintain the process within the specific aims of production when all these aims are satisfied, and to help to return the process to the specific aims of production when at least one of these specific aims is not satisfied.

This control device functions simultaneously in synchronous and asynchronous manner. Synchronous functioning for the acquisition of information is based on periodic acquisition of the messages sent by the environment. Asynchronous functioning for the issuance of messages addressed to the environment is with the understanding that these messages are sent only when they are necessary to maintain or to return the process to the specific aims. Advantageously, since the messages are addressed to them only when they are necessary the operators are much less saturated than in the procedures of the background art and can be devoted to the most important information of these messages. In addition, the procedure is adjusted so that the messages are sent at an opportune time, and, when it is desirable, as soon as possible. During an information acquisition cycle it will therefore happen frequently that no action message will be sent.

The procedure according to the present invention includes at least the first two stages among the four following cyclical principal stages.

Stage one is to reword and register, e.g. record, that is to evaluate, the state of the process and its evolution from information, especially the information supplied by the sensors.

Stage two is to judge or qualify in terms of seriousness the recording as a function of the functional context of the process, and to issue a message according to the judgment made. Thus, a state or an evolution of the process are deemed "problematic" if they do not allow one to satisfy the production goals and a message concerning them is then sent if it is appropriate to modify the control settings of the actuators in order to maintain or return the process to the specific aims of production.

Stage three is a correction stage. This function is intended, if necessary, to designate the necessary modifications of the actuator control values in order to satisfy or to maintain the production goals and to schedule these modifications over time.

Stage four is a cooperation stage. This function assures communication and interfacing with the process operators and adjustment of the messages supplied by the device according to the invention as a function of the control operators for which they are intended and as a function of the functional context of the process.

Only the "recording" function is synchronized with the information transmitted by the sensors; the other functions are activated asynchronously. The "judgment" function is activated as soon as the "record" function detects a "phenomenon", the "correction" function is activated when the "judgment" function has determined that the state of the process was "problematic", and the "cooperation" function is activated at the initiative of the control operators or at that of the device when this is necessary.

According to the invention, the principal function "RECORD" includes essentially the following stages (1)–(5): (1) development of values of quantities for the perception of the state of the process and development of signals, these being ordered numerical sets of values of the quantities; (2) description of the evolution in the state of the process by means of a trajectory in state space and trajectories in phase spaces relating to each quantity, and digitizing of the trajectories by means of a partitioning of spaces; (3) description of the evolution in the state of the process on the basis of the progress in the quantities of perception themselves, in the form of a global time series of events relating to the quantities. This time series may be temporal, spatial, or spatial-temporal. Two types of events will be defined: discrete events and signal events; (4) description of the evolution in the state of the process by locating, in a global time series of events, global typologies of time series to be called "signal-phenomena", and (5) description of the evolution in the state of the process in the form of a time series of process-phenomena, the definition of which takes in points 2, 3, and 4 above.

These five steps are described in greater detail below.

The FIRST STAGE of PERCEPTION constructs and orders values taken in the course of time with quantities that allow for a description of the state of process.

The device used in the present invention distinguishes between two types of quantities, measured quantities and quantities of perception, according to the use being made. A measured quantity is either one in which values have been obtained directly from the sensors used in the process, or one whose values have been arrived at from other quantities on the basis of numerical mathematical models. Quantities of perception are measured quantities that contain information on the state of process and its evolution in the course of time, that is X(t) and X'(t) as previously defined. The values of such quantities are not generally directly measurable and they are calculated or deducted as indicated below. Thus, quantities of perception form components of what is commonly called an X state vector in state space with n dimensions, "n" being the number of quantities of perception.

The values of these quantities are derived from an interpretation of the available information on the process, especially the information transmitted by the sensors. "Value" is actual data providing generally the amplitude of a quantity or whole data indicating, for example, a true/false character carried by the quantity (i.e., a binary value). The values taken by a quantity can be ordered in a spatial manner and/or a temporal one.

We shall first describe an organization of the temporal type, in a case of an example in which these values go through a bus of data. For dating the values, one may then use a classic management system of the bus that is outside the device used in the invention, and therefore takes various clocks into account, these being at times independent from one another. Thus, each value is assigned a "value date", and this dating is independent from the clocks of the device proper, as used in the invention.

Three main temporal modalities can be distinguished with respect to the dating of values, according to the types of quantities, namely, periodic quantities, factual quantities, and periodic quantities.

Periodic quantities are quantities when the duration between two successive values taken by such quantities remains constant over time. The notion of periodic quantity is therefore linked to that of sampling period and sampling frequency of the quantity. The "value dates" associated to the values of a periodic quantity are therefore a whole multiple of the sampling period and these dates are interpreted by the device used in the invention as values of a quantity known as "universal time".

Factual quantities are quantities which are neither periodic nor aperiodic. The values of such quantities are therefore only known on specific dates and the "value date" is then assigned according to specific modalities, with reference to clocks of any nature. It may be, for example, the date on which a sample was taken or sample analysis was carried out or validation was given to values having being gathered. In those three examples, the clocks may be the watch carried by an operator, a clock on the wall, or that of a data terminal. Thus, the dates associated to factual quantities are not interpreted as a measure of universal time, but rather as indices allowing for the organization of a sequence of values of such factual quantities.

Aperiodic quantities are quantities when the number of values that a quantity takes over a pre-determined period remains constant over time. This is a specific case of factual quantities where one guarantees a constant number of measures or values over the period, in the course of the process. The "value date" associated to the values of aperiodic quantities has the same properties as those for factual quantities.

The need for a distinction between aperiodic and factual quantities is based on the fact that the "value date" is generally interpreted with respect to physical objects with a finite useful life. But since the useful life for each of the objects defines a time period, the dates assigned to the values of aperiodic quantities can be assigned to these objects and ordered within the intervals of time corresponding to their useful lives. Consequently, the "value date" associated to the values of aperiodic quantities is interpreted as a measure of a specific quantity, that is of a "relative time" for an object with a finite useful life. Global chronology is provided by that of the objects themselves. Since the environment of the device used in the invention may operate on multiple clocks of various kinds, it is essential that comparable values of quantities be organized. Thus, two different "value dates" associated to different but comparable quantities will correspond to different dates.

We shall now describe a spatial type of organization of values of quantities. That would be the case, for example, in the control operation of a blast furnace. If the quantity relates to a temperature on the wall, each value of this quantity corresponds to a given point on the wall, called a "point of acquisition," located by means of a "position". A set of such positions is called a zone. These points form a set whose structure is linked, for example, to the installing of sensors in the system and this set may be ordered. In the case of wall temperatures in a blast furnace, they may be ordered according to their "position" on the wall diameter and/or their "position" relative to the height of the wall. The organization of this set of points will then allow for the setting up of values relating to the points, following an ordered sequence of value/position pairings forming a spatial signal.

Lastly, the organization of values may be both spatial and temporal, in other words spatial-temporal. The ordered sequence of pairings or corresponding triplets then forms the spatial signal.

Furthermore, the process in the invention is set out at a pace, in accordance with a so-called period of acquisition. At each start of a cycle in the implementation of the process in the invention, one acquires information on the process: value/value date pairings; value/value position pairings; or value/value date/value position triplets. An acquisition date, corresponding for example to the cycle number registered since the last initialization of the device, is associated with each item of information. The location of acquisition dates by means of a cycle number introduces in fact a digitization of time. Each individual datum is thus a triplet or a quadruplet: value/value date/acquisition date; value/value position/ acquisition date, or value/value date/value position/ acquisition date. These data are then stored in a database, with index, following the acquisition date.

Each value of a quantity is thus linked to two dates and/or a date and a position such as: (1) an acquisition date for the indexing of data storage; (2) a value date for ordering numerical sequences of values of one specific quantity, thus defining a quantity's temporal signal; (3) an acquisition point position for ordering a numerical sequence of values of one specific quantity, thus defining a quantity's spatial signal; (4) a value date and a position for ordering numerical sequences of values of one specific quantity, for example temperatures measured over the walls of a blast furnace, thus defining the spatial-temporal signal associated to this sequence of quantities of the same nature.

In the rest of the procedure, we shall attempt to describe the evolution of the process by means of a consolidated global sequence of values of all quantities, ordered following the acquisition date, and by means of quantity signals, each signal thus being defined as an ordered sequence of values of one specific quantity. This double indexing data management system has the distinct advantage that it allows for the device used in the invention to reason in continuous time and to manage numerical data following the modalities of a discrete time system.

The SECOND STAGE of PERCEPTION describes the evolution of the process by means of a "digitized" trajectory that follows the state of process in state space, as it would flow from a consolidated global sequence of values of all quantities, and by means of "digitized" trajectories that follow the values of quantities in their phase spaces, as they would flow from signals corresponding to each, be they temporal, spatial, or spatial-temporal.

The digitization of trajectories depends on the production objectives or designs and it passes through a partitioning of state space and the phase spaces, in accordance with these designs; as used in the invention, this partitioning is done at each information acquisition cycle.

State space is defined as a space, the dimensions of which are the quantities of perception and in which a state of process is represented by an X(t) state vector, the components of which are the values of the corresponding quantities of perception. If all these values are defined in R, state space is defined in $R^n$, where "n" is the number of components of the X state vector. The coordinates of a point in state space are the values of the quantities of perception of the state described by that point.

The evolution of the process may be described as a succession of states represented by points in state space, the succession forming an evolution trajectory of the process in that space. This evolution trajectory has a projection over each of the dimensions of state space; this projection corresponds to successive values of a quantity of perception in the course of the evolution of the process represented by the trajectory.

The partitioning or digitization of state space should be achieved by means of state subsets that correspond to determined state types, so that each state of process is located not by means of the X state vector, but by means of the subset or the type to which it belongs. Thanks to such partitioning, representation of the evolution of the process can also be digitized. One can go from a representation by means of a continuous evolution trajectory to a representation by means of a succession of changes in state types, which is known as a "digitized trajectory" of the evolution, To achieve state space partitioning, one therefore defines a finite and countable number of subsets of space. According to one feature of this invention, this partitioning is possible, depending on the production objectives assigned to the process at each information acquisition cycle regarding the process.

Starting from the production objectives assigned to the process, expressed for example as quantitative and qualitative criteria to be met by certain incoming and outgoing flux, with the help of the body of knowledge concerning the behavior of this process, one defines some "designs" for the quantities of perception, in such a way that if one state of process is defined by means of values of quantities of perception that belong to these designs, then this state is deemed to have met the production objectives.

At each acquisition cycle, the designs get to be updated and one then does state space partitioning again, according to the new objectives.

For a quantity the values of which are in real numbers, a "design" corresponds to an interval as determined by inferior and superior limits ("inferior value" and "superior value"), represented for example as [ValeurInf, ValeurSup]; sometimes, the values of the limits are determined by thresholds. The definition of such objectives and/or limits of intervals is achieved by the process run operators, especially according to experience. The value of the limits may be constant or a function of the value of other quantities and that of other limits, it is not always possible to define an "interval of satisfactory values" or the value of the limits for each quantity of perception.

Thus, on the dimensions of the space state, partitioning may be done in three parts: [−∞, ValeurInf]; [ValeurInf, ValeurSup]; [ValeurSup, +∞]. The whole of the [ValeurInf, ValeurSup] subsets specific to each dimension defines a "hyper cube" in state space.

Thus, any given state of process may be considered as belonging to this hyper cube or not, depending on whether or not it meets the objectives set out for the process production. Fine tuning the partitioning of continuous state space may, however, require the definition of a greater number of subsets.

Therefore, partitioning of state space defines, for each acquisition cycle and every component of the continuous state vector, intervals of values in $R^n$, it associates a relative whole number to each interval of values. Thus, the partitioned state space is a space defined over $Z^n$.

Phase space is defined as from a signal, which means from a sequence of values of one specific quantity, ordered according to a variable, as for time in the case of a temporal signal or position in the case of a spatial signal. By definition, this space presents only two dimensions, the first being the value of the quantity, and the second being the derivative of this value according to the variable. Phase space is thus specific to each quantity of perception and there exists at least as much phase space as there are quantities of perception.

Therefore, in cases where the variable is time, for a state of process located in state space by an X state vector, the components of which are $X_1(t), X_2(t) \ldots, X_i(t), \ldots X_n(t)$, each component represents the value $[=X_i(t)]$ of the corresponding $G_i$ quantity of perception at the instant t.

Starting from the temporal signal of a G quantity, formed by a sequence of values of this quantity, ordered according to their value date and to which X(t) belongs, one may calculate the first X'(t) derivative of the X(t) value. X(t) and X'(t) then determine the coordinates of a point in the phase space of this quantity. In the course of a change in behavior of this quantity, the whole of the values taken by the [X(t), X'(t)] pairing and the succession of corresponding points form a trajectory of the behavior of this quantity.

Partitioning or digitization of phase space of a quantity should be realized by means of subsets, each corresponding to a determined type, so that one is thus able to locate the "value" of a quantity in process, not by means of [X(t), X'(t)] values, but by using the subset to which the corresponding point belongs. Thus, for partitioning of phase space, one defines a finite and countable number of subsets in this space. One may partition phase space by following a method comparable to that previously described and reassigning the same "designs" for the first dimension corresponding to the value of the quantity.

According to a feature of the present invention, this partitioning may also be carried out at each acquisition cycle, in accordance with production objectives already mentioned for partitioning state space. Each point of phase space of a quantity may be assigned to one of the subsets of this space. The representation by assignment thus constitutes a digitized representation of the value of the quantities.

Figure 2:
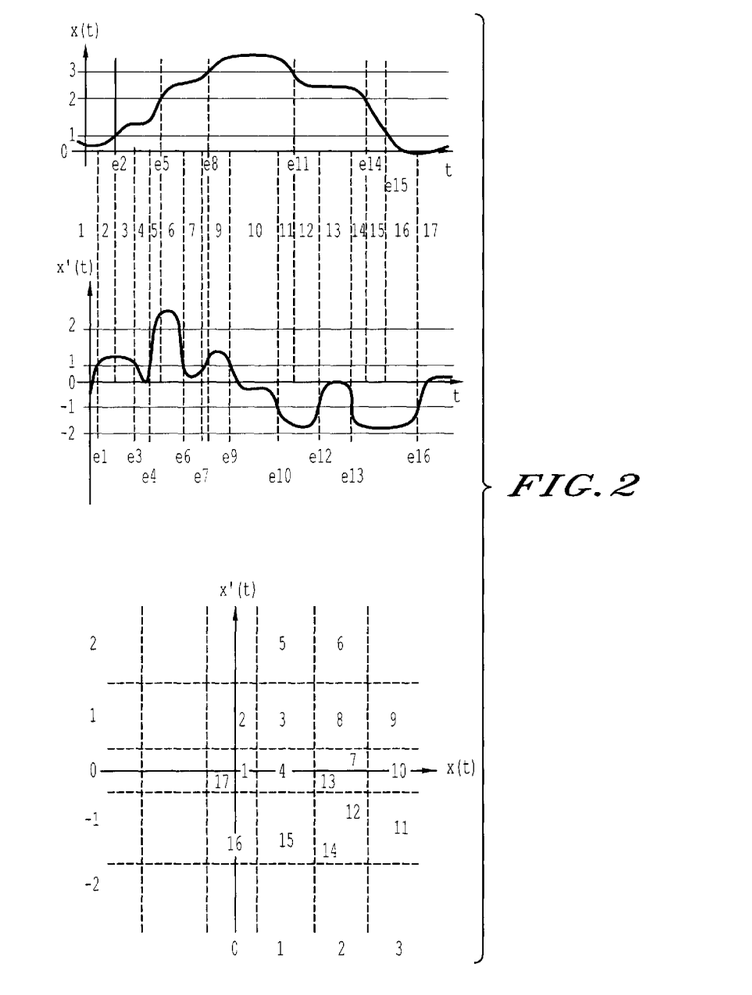
FIG. 2 shows the principle of discrete representation for a recorded quantity x(t) and its derivative x'(t).

FIG. 2 illustrates this principle for an x(t) quantity of perception and its derivative x'(t); that is, for a component of a state vector, which develop over time as shown in the left portion of the figure. The digitized representation one may arrive at is shown in the right portion.

Thanks to this partitioning, representation of the behavior of a quantity may thereafter be digitized. One goes from a representation by means of a continuous trajectory to a representation by means of a succession of changes in types, which is known as the "digitized trajectory" of the behavior of a quantity, Thanks to the present invention according to which, at every cycle of acquisition, the "designs" for each quantity of perception may be updated and the partitioning of state space and that of the phase spaces may be renewed, the process of control automatically adapts to the following: changes in conditions or operational context in the process, such as changes of point of operation or changes in the nature of the flux of matter or flow of energy; and evolution in the process, relative for example to wear, aging, or damage to the organs of this process.

Thus, the control process in the invention is "reactive" in the sense that it is capable of reacting independently to alterations of its environment.

Two aspects of the invention deserve to be singled out at this point, as consequences of the partitioning: (1) the reactivity produced by the detection of discrete events and (2) the adaptiveness produced by a partitioning based on updated numerical designs. These two properties represent major advantages when compared with the fuzzy logic approach of the background art.

According to a feature of the present invention, one is able to "perceive" the evolution of the process not only by means of a trajectory in state space, but also by means of the trajectory of each of the quantities of perception in their phase space.

This double mode of perception, in state space and phase space, is indeed especially relevant since a trajectory with a zero projection when measured by a dimension corresponding to a quantity of perception of state space does not necessarily correspond to a point in the phase space of that quantity. This means that, if the evolution of a process has an empty "translation" or if there is absence of evolution in state space, its "translation" is not necessarily empty in phase space, at the behavior stage of each of its quantities of perception (and vice versa). The evolution of a process (trajectory in state space) and the behavior of its quantities of perception (trajectory in phase space) are most definitely linked, but the relationship that links them is particularly difficult to establish in the case of complex dynamic processes. The present invention allows for a remedy, especially thanks to the third, fourth, and fifth stages of perception now described.

The THIRD STAGE of PERCEPTION describes the evolution of the process on the basis of the evolution of the quantities of perception themselves, in the form of time series of events relating to these quantities. These time series may be temporal, spatial, or spatial-temporal.

The term temporal "time series" is used in the sense of a sequence of pairings (event/event date) in which "event" refers to an event relating to a quantity and "event date" refers to the date assigned to that event. The term spatial "time series" is used in the sense of a sequence of pairings (event/event position) in which where "event position" refers to the position assigned to that event. The term spatial-temporal "series" is used in the sense of a sequence of triplets (event/event date/event position).

To arrive at these time series, one should therefore define certain events, their mode of detection, and their mode of dating and/or localization. Let us now define a first type of event, the "discrete event".

By definition, a discrete event relating to a quantity of perception is generated when the evolution of the process produces a change in the subset to which the current representative point of the quantity belongs in its phase space, given the definition of the subsets and the partitioning of the phase space, as provided below.

One then assigns to a given discrete event corresponding to the passage of one subset to another the date of that passage. For example, with reference to FIG. 2, the date $e_1$ is assigned to the discrete event $E_1$ which corresponds to the passage of subset 1 to subset 2. Thus, the behavior of each quantity may be described by means of a sequence of (event/event date) pairings forming a discrete event time series of that quantity; FIG. 2 illustrates that principle for a quantity of perception.

We shall now provide the definition of signal events.

It has been seen previously that an ordered numerical sequence of "values" of one specific quantity defined a signal; that signal may be temporal, spatial, or spatial-temporal. By means of analysis, we shall locate the behavior of the quantity associated to that signal and generate a "signal event" for each behavior change.

According to the present invention, to this end one must define classes of behavior, a method to recognize the behavior of a quantity in order to assign it or not to one of these classes, and a method of dating the change of class of behavior. Based on these definitions and methods, one may generate and date a signal event for each change of class of behavior and arrive at a signal event time series (event/event date). The implementation of a method of recognition may necessitate the configuration of the signal representing the behavior; it is thus necessary to add a signal filtering method, adapted to the method used, upstream. Classes of behavior may be parametrized in a constant or variable manner. In the following example, these parameters relate in particular to the constraints on each model and its analysis scales.

The following example illustrates the present invention with respect to the definition of signal events and their method of dating.

For each of the quantities of perception, one defines several possible models or behaviors. Each behavior model may be represented by a type of trajectory in the phase space of that quantity and each behavior model and/or type of trajectory thus defines a class of behavior.

A signal event for a given quantity is then generated as soon as one of the following conditions (1)–(3) has been detected: (1) recognition of the establishment of a behavior model; (2) recognition of the completion of a previously recognized behavior model; and (3) inability to recognize a behavior model.

To detect these conditions, one may, for example, use one of the two generation methods of analysis of the signal or recognition of temporal forms described hereafter.

Analysis of the signal is adapted in order to recognize a signal's behavior relative to a whole temporal reference set of behavior models and in accordance with a given temporal analysis scale. A temporal behavior model corresponds to a set of constraints for a predetermined temporal segment of the signal. A temporal analysis scale corresponds to the temporal segment needed for signal analysis in order to recognize the behavior model. As a consequence, the temporal segment of definition of a signal's behavior in a quantity is of a lesser duration on the temporal analysis scale.

Recognition of temporal forms is adapted in order to recognize a signal's current behavior relative to a whole temporal reference set of temporal forms and in accordance with a given observation scale. A temporal form corresponds to a set of constraints for an assembly of temporal behavior models. In the use of this method, a temporal analysis scale is at least equal to the sum of temporal analysis scales associated to the temporal behavior models that include the temporal form model to be recognized.

At this point, it is appropriate to define a dating method of the signal event. In the case of temporal signals, a simple illustration of this method determines the datum (triplet or quadruplet defined below) of the signal that lies at the source of the signal event and assigning the "value date" of this datum to the "event date" associated with that signal event. In the case in which models are used to define behavior classes, the dating method depends on the behavior model retained; the research for the datum of the signal that lies at the source of the signal event being generated is carried out on the analysis scale associated to that model.

As in discrete events, the behavior of each quantity is also described by a sequence of (event/event date) pairings that form a signal event time series of that quantity. FIG. 2 illustrates this principle for a quantity of perception. This description of the behavior of each quantity is linked to the definition of classes of behavior for that quantity, for example in the form of models of types of trajectories, in the same way that the description of behavior for discrete events is based on the partitioning of that quantity's phase space.

Globally, one arrives at a series of (event/event date) pairing sequences in which event refers to either a discrete or a signal event, in other words a suite of time series of events relating to that quantity. To describe the evolution of the process, these series may be aggregated into one single global time series of events. This aggregation is produced by assembling all the (event/event date) series for each "quantity"; one thus arrives at an (event/event date/quantity) sequence of triplets. These triplets constitute a global time series of events that describes the evolution in the overall behavior of the quantities. Preferably, this global time series is ordered according to the "event date" values of each triplet.

This principle allows for the association of a global time series of events with each temporal evolution of a continuous process, in which each event corresponds to a change in the type of behavior of a signal event quantity or in the subset observed in the phase space of a discrete event quantity.

According to a feature of the invention, one is able to take into account the behavior of quantities of perception during the evolution of the process, in the form of a global time series of events, with each event of this series relating to the evolution of one of these quantities.

The FOURTH STAGE of PERCEPTION attempts to describe the evolution of the process by locating, in a series of global events, typologies of global time series called "signal-phenomena" because the events of these series are located by means of an observation of signals. One therefore has to define the signal-phenomena and their mode of detection and dating; also defined is a means of qualification for these signal-phenomena. One defines the signal-phenomena by means of types of global time series of events relating to the evolution of the process, in which each type of series presents discrete events and/or signal events of a specific quantity or different quantities. A signal event for a type of time series may be temporal, spatial, or spatial-temporal, as previously described.

Thus, a type of time series is parametrized and characterized by: (1) the definition of each event that it includes and which, in the case of signal events, integrates the constraints relating to a quantity's form of the signal; and (2) the date and/or the position of these events, and the interval of time or position that separates them, that integrates the "event date" and/or "event position" value for each event, and the spatial or temporal constraints relating to the sequencing or positioning of events.

A type of time series that only contains temporal signal events corresponds to a signal-phenomenon called "temporal". A type of time series that only contains spatial signal events corresponds to a signal-phenomenon called "spatial". A type of time series that contains both temporal and spatial signal events corresponds to a signal-phenomenon called "spatial-temporal".

The recognition or detection of signal-phenomena thus identifies to which type the global time series of events relating to the evolution of the process belongs. Thus a signal-phenomenon is generated each time a type of predefined series of events is recognized in the global time series of events relating to the evolution of the process.

At this point, it is advisable to define with precision a dating method of the process or signal-phenomenon from start ("start date signal-phenomenon") to finish ("end date signal-phenomenon"). For such dating, in the realization mode described, the followings assignments (1)–(4) are made.

(1) To "start date signal-phenomenon": the value "event date" of the discrete or signal event which is the oldest in the time series and corresponds to a known type of series.

(2) To "end date signal-phenomenon": the value "event date" of the discrete or signal event which is the youngest in the series and corresponds to a known type of series.

(3) To "start detection date": the value given by the internal clock of the device used in the invention, at the time of detection or recognition of the signal-phenomenon.

(4) To "end detection date": the value given by the same internal clock at the time of the end of detection or the end of recognition of the signal-phenomenon.

One also defines a means of qualification of the signal-phenomena. Such means may take into account amplitude and localization.

The amplitude of a phenomenon is the measure of the gap separating the actual behavior and the expected reference behavior. In the case of temporal or spatial-temporal signal-phenomena, the amplitude corresponds to a label associated with the partitioned portion of state space which lies at the source of the detection of a signal event participating in the detection of the signal-phenomenon being considered. The localization of signal-phenomena is borne by the list of quantities over which a particular behavior is being observed. In the case of a temporal signal-phenomenon, the list only contains the quantity of perception associated to it. In the case of a spatial or spatial-temporal signal-phenomenon, the list contains the whole set that lies at the source of the detection of the signal-phenomenon. More precisely, this list determines the geographical area of the process involved in the signal-phenomenon.

The labels are chains of characters containing adjectives that qualify the size of the phenomenon, its speed, or its asymmetrical character, for example: amplitude, speed, and asymmetry qualifications.

Amplitude qualification. If the signal-phenomenon relates to temporal alterations of quantities assimilated to rising or failing straight lines, possible qualifiers are: very strong increase, strong increase, increase, decrease, strong decrease, very strong decrease. If the signal-phenomenon relates to temporal alterations of quantities assimilated to levels, possible qualifiers are: very high, high, low, very low.

Speed qualifications. If the signal-phenomenon relates to temporal alterations of quantities assimilated to rising or falling straight lines, possible qualifiers are: very strong increase, strong increase, quick increase, increase, decrease, quick decrease, strong decrease, very strong decrease.

Asymmetry qualification. Temporal: very irregular, irregular, constant. Spatial: dissymmetrical, strongly heterogeneous.

The FIFTH STAGE of PERCEPTION attempts to describe the evolution of the process by integrating all the elements contained above. To that end, we shall start by defining some "process-phenomena" by integrating all these elements, in order to be able to describe the evolution of the process by means of a sequence or time series of process-phenomena. The definition of process-phenomena should therefore integrate all the elements explained above which are likely to describe the evolution of the process on the basis of: temporal, spatial, and spatial-temporal signals of quantities, the trajectory of each quantity in its phase space and the continuous or digitized evolution trajectory of the process in state space. The integration of all these elements allows one to arrive at a more complete description and a more relevant perception of the evolution of the process, which permits considerable improvement of the control of the process.

This problem of integration and aggregation of various means to describe the evolution of the process may be illustrated in the following way. Quantities X of the description of the state of process conform to two types of classic behavior laws.

First law: $X=f(t, x)$, where "$t$" is the date or time and "$x$" the position. (1)

Second law: $f(X_1\ dX/dt_1\ dX/dx)=0$, a differential equation of the first order. (2)

The first law corresponds to the preceding descriptions in state space: a state vector the components of which are the X quantities and a trajectory of this vector in that space. The second law corresponds to preceding descriptions in the phase spaces of each X quantity.

One problem addressed by the present invention has to do with the integration and the aggregation of these two laws of behavior of the quantities in the case of a complex dynamic process.

In order to solve the problem, one thus starts out by defining a process-phenomenon by means of a "signature", in other words a continuous or digitized "type of trajectory" in state space and associating means of detection to that signature. This includes invalidation/confirmation, means of dating, and qualification which integrate the other elements explained above in the description of the evolution of the process.

Since it integrates all the elements explained above in the description of the evolution of the process, this definition of a process-phenomenon has the distinct advantage that it allows for a distinction between two phenomena with the same trajectory in state space but different evolutions for some quantities of perception on that trajectory. Thus, the definition of the process-phenomenon integrates the evolution of the quantities of perception in the form of discrete or signal events (first level) and/or time series of events (in other words, signal-phenomena, second level), and even time series of signal-phenomena (third level).

In the realization mode of the process in the invention, the definition of process phenomenon thus includes: (1) a type of trajectory in state space; and (2) classes of events and/or time series of events (signal-phenomena) and/or time series of signal-phenomena, especially a category for the detection of the start of the process, a class for the detection of the end of the process, and a class of qualification. One may also add a class for invalidation and/or confirmation of the process.

As with the previous description, a time series may be temporal and is then expressed as a list of (event/event date) pairings. It may be spatial and expressed as a list of (event/event position) pairings. It may also be spatial temporal and expressed as a list of (event/event date/event position) triplets.

The relevance of a definition which is so precise and complete for a process-phenomenon can be illustrated via the following example. A discharged battery and a short-circuited battery have similar effects on the performance of a motor vehicle: the vehicle will not start, the lights do not come on, and the car radio remains silent. One runs the risk of confusing the process-phenomenon of "short circuitry" with that of "battery discharge", and yet these two phenomena are different. The two may be differentiated when one considers the "discharge" of a battery as a slower qualified phenomenon than that of short circuitry. Means of confirmation may also be used to differentiate between the two phenomena, for example the event represented by the car lights being left on or off during the preceding night. The event "lights on" and the period "preceding night" then constitute a time series or a signal-phenomenon forming one class for a single element of confirmation or invalidation. This definition, especially in its detection and invalidation/confirmation aspects, has the distinct advantage of taking into account the timely or untimely character of a process-phenomenon in a given current situation and integrating elements of the past, present, and immediate future. In cognitive terms, the definition of these classes brings about some information on the causality between phenomena. For example, it is not necessarily timely to take into account a process-phenomenon if its causes or other events or present or previous phenomena have already been taken into account, or if its effects or other events or future phenomena do not materialize.

The definition of the process-phenomenon is related to that of the rules for dating which apply to elements (events, time series) of classes for the detection of the start and the end of the process. For example, the rule of determination for the start date takes an event's "event date" or the "start date process phenomenon" of a phenomenon of the class of detection for the start.

This definition is also related to that of the rules of qualification. As for signal-phenomena, the qualifier of a process-phenomenon relates for example to the phenomenon's amplitude and/or its localization. The qualifier may vary from start to finish, but it varies no more thereafter. Examples are a most recent or series qualifier, a majority qualification, and a localization qualification as follows.

A most recent or serious qualifier is a qualifier assigned to a process phenomenon and is that of the most recent or serious occurrence in the whole set of elements of the qualification class. A majority qualification is a qualifier assigned to a process phenomenon and is the one most often assigned to occurrences in the whole set of elements of the qualification class. A localization qualification is defined as the minimum geometrical area covering the whole set of quantities relating to the elements of the qualification class, or as the area formed by the whole set of positions of the elements of the qualification class.

In the absence of localization qualifiers, a process-phenomenon is qualified as being "global". On the basis of this definition, during the evolution in the state of process, one will thus detect a succession of process-phenomena and arrive at a list or "time series", each element of which includes at least the following points: the name of the process-phenomenon, the start date, the end date and the list of pairings (qualifier, date of qualifier assignment).

In the process as used in the present invention, the perception of the state and evolution of the process thus integrates both the global behavior as described in state space and the behavior of the quantities of perception.

As set out in the invention, the second main function, JUDGING, should lead to the transmission of messages intended for agents of the process environment. These would especially be aimed at system control operators, to help them in evaluating the timeliness of changing the settings of certain action devices, in order to meet with the current production objectives of the process. These messages must contain a description of the problems relating to the current situation, given the production designs, and should be accompanied by the necessary information to "convince" the operators of the significance of future problems.

The transmission of these messages must be done in a timely manner. Thus, one can sort out the messages by their seriousness and only transmit the most serious messages. At the end of a cycle of information acquisition, it sometimes happens that no message is transmitted.

Finally, when those messages are intended for the persons in charge of the control, those messages have to be drawn in a natural, symbolic, and/or a phenomenological language, as sentences along with graphics.

According to the invention, the second main function, JUDGING, primarily includes the following steps: (1) to evaluate the context of the evolution of the process and classify the pending process-phenomena according to criteria of gravity and according to this context; and (2) to transmit messages concerning the process-phenomenon classified as the most serious ones.

The FIRST STEP of JUDGING prepares messages likely to be transmitted, as well as the messages' broadcast criteria by evaluating the process of the evolution context, and by classifying the pending process-phenomena according to criteria of gravity, and according to this context.

In the realization mode of the process according to the present invention, in order to take into account the operation of the process, the qualification concerning the gravity of the process-phenomenon goes through the definition of: (1) an event class, and/or a time series of events (signal phenomena), and/or time series of signals-phenomena (process phenomena) which define the context elements of the process operation to be taken into account in order to qualify the context and/or the gravity; (2) context qualification rules and/or rules of the gravity of the pending process-phenomenon, i.e., detected and in progress, which apply to the elements of this class, such as the nature and the amplitude of a specific process phenomenon belonging to this class.

In the realization mode of the process according to the present invention, the context qualification and the gravity qualification of a process-phenomenon also go through context management rules.

We will first describe general or particular rules for this context qualification along with the elements, especially for process-phenomena, to which those rules apply.

The gravity qualifier of a process-phenomenon deals with its problematic character as far as satisfaction of the process operation aims is concerned, which is updated daily during each work data acquisition cycle. A process-phenomenon is problematic if its presence burdens the capacity of control operators to meet production objectives.

Therefore, a process-phenomenon is qualified in terms of "problematic," "alarm" or "warning" gravity if it is necessary to take it into account in order to interpret the evolution of the process behavior and/or to undertake corrective actions. By the definition of these qualification rules, a pending process-phenomenon qualified as "alarm" is of greater concern than one qualified as "warning". Inversely, the detected process-phenomena can also be qualified as "not serious" if it is not necessary to take them into account in order to interpret the evolution of the process behavior.

The definition of "gravity classification contexts" allows us to decide the gravity of a process-phenomenon according to the real use context of the process. Thus, any detected process-phenomenon is first qualified according to its gravity using one of the following qualifications (1)–(3).

(1) "Not serious". In all of the process-phenomena, there is a process phenomenon category whose detection does not hold a problematic character as such; their detection is then justified by the necessity of constructing a process state which is as complete as possible.

(2) "Always serious". In all of the process-phenomena, there is a process phenomenon whose detection, under normal operating conditions of the process, is always problematic, and detection of such a pending process phenomenon requires that the process operators be alerted.

(3) "Contextually serious". The process-phenomena of this category are those which may be problematic in the operational context, whereas in another context they may be considered insignificant; in the first case, it is necessary to alert the operators, whereas in the second case, it could be unnecessary to do so. The decision as to the seriousness of this process-phenomenon category depends therefore upon the current described situation, defined in particular by the set of process-phenomena in progress (i.e. whose start date is known, but not the end date), as well as recently finished process-phenomena: by definition, the gravity of it "contextually serious" process-phenomena depend upon the current context.

The gravity of a process phenomenon in the "contextually serious" process-phenomena category is then judged by a synthesis of the present and past state of the process as described by the elements of the process-phenomenon context class. This synthesis is performed in order to satisfy current aims or production objectives. This class is composed of events, signal-phenomena or other process-phenomena, and the classification context is defined by, among others things, time restrictions expressed in terms of process presence or absence of at least one process-phenomenon on a present or past period. Overall, we can define, for example, the following contexts (1)–(3):

(1) "Correct process" context in the case where the present and past state of the process meets control operators' expectations, in the sense that production objectives can be achieved without it being necessary to engage in any action; this concept corresponds to a "satisfactory" decision.

(2) "Slowed process" context in the case where the present and past state of the process will not permit the operators to meet production objectives in the present situation. This context corresponds to an "unsatisfactory" decision, and may imply the risk of a production loss. By definition, this context corresponds to at least another process-phenomenon in progress for the class defining this context. In this context, the only "problematic" process-phenomena are in general the process-phenomena qualified as "catastrophic" in the sense that their pending status worsens the situation, and may lead to a complete halt in the process, even to the destruction of all or part of the process (i.e. partial production and production tool loss).

(3) "Out of norm" process. Also by definition, this context corresponds to at least one other specific process-phenomenon underway of the class defining this new context; this context means that the process is no longer being used. In this context, the process according to the invention is no longer able to ensure useful aid to the process, because the causal relations between signal-phenomena and process-phenomena are considered to be no longer valid. In this context, the five steps in the process concerning the process perception are taken cyclically in order to guarantee analysis continuity and to continue to transmit process-phenomenon messages, but the gravity of the pending process-phenomenon is no longer qualified.

In a more specific way for some processes and for some process phenomena, in the case of a blast furnace, we can define the following particular contexts (1)–(4).

(1) "Correct crucible drain" context, defined by the absence, over the last eight hours, of the occurrence of any type of "crucible melting retention level" process-phenomenon.

(2) "Correct Melting Temperature" context, defined by the absence of any unfinished process "Melting Temperature Level" process-phenomenon qualified as "very high" or "very low"; and by the absence, over the last eight hours, of any "Casting Melting Temperature" qualified as "very high" or "very low." Thus, we can see that the context definition calls for two different elements (process-phenomena) in the context class.

(3) "Correct load lowering" context, defined by the absence of the "hooking" process-phenomenon over the last hour elapsed, and by the absence of the "Load lowering short term quality" process-phenomenon over the last four hours.

(4) "Correct thermal loss" context, defined by the total absence of the "Level of thermal charges in the lining" process-phenomenon.

We will now describe the rules of context management as follows. A context which may be used to qualify the seriousness of a process-phenomenon is called "active". Contrarily, an inactive context cannot be used to qualify the seriousness of a process-phenomenon.

By using the above context definitions, the rules of context management are therefore as follows.

The "out of norm process" context is "active" if the constraint that defines it is verified. It is "inactive" in the opposite case.

If the "out of norm process" context is "active", then all other contexts are "inactive"; since this is a general constraint, it will not be mentioned again in the following management rules.

The "slowed process" context is "active" if the constraint that defines it is verified. It is "inactive" in the opposite case. If the "slowed process" context is "active", then every particular context as well as the "correct process" context are "inactive".

A particular context is "active" if the "slowed process" context is inactive and the defined temporal-logic constraint which defines it is satisfied; it is inactive in the opposite case.

The "correct process" context is active if the "slowed process" context is inactive and if all other intermediary contexts are active. It is inactive in the opposite case.

The rules for qualifying seriousness and context can then be completed as follows:

The seriousness of any process-phenomenon is not qualified in the "out of norm process" context.

The seriousness of any process-phenomenon in the "never serious process-phenomenon" category is qualified as "not serious", whatever the active contexts might be, except in the case of the "out of norm process" context.

The seriousness of any process-phenomenon in the "always serious process-phenomenon" category is qualified as "alarm" or "warning" whatever the active contexts may be, except in the "out of norm process" context, and depending upon the qualification given by the operators.

The seriousness of any process-phenomenon in the "contextually serious process-phenomenon" category is most serious of any qualifier in all of the qualifications attributed in the active context, again except for the "out of norm process".

The goal of the seriousness qualification in a process-phenomenon being the transmission, in real time, of messages to the process control operators, the context dating has to be done as soon as possible, which means at the detection dates of the beginning and the end instances of elements of the class defining a context, for example a process-phenomenon class. Thus, the seriousness of unfinished process-phenomena is judged according to the current context.

With this purpose, the classification contexts are dated in relation to the current date. The date of the beginning of a context is the detection date of the change from an inactive state to an active state. The date of the end of a context is the detection date of the change from an active state to an inactive state.

The SECOND STEP of JUDGING transmits messages to the environment, taking into account only the qualification of their seriousness in the current context of the process evolution.

According to the present invention, we classify the detected process-phenomena according to the degree of seriousness that took place, or if necessary in the current context, evaluated as mentioned above.

For any process-phenomenon qualified as "alarm" or as "warning", we transmit a message including the descriptive elements of this process-phenomenon, especially its nature and the elements concerning its position, its dating, and its qualification.

The effective message transmission constitutes an "alert".

According to the process, since the control operators are only informed, in real time, of the process-phenomena qualified as "alarm" or "warning", these operators are not informed, at least in real time, of the presence of a non-serious process-phenomenon, regardless of the operational context of the process, which advantageously avoids an information overload for the operators and allows them to focus on more important information at the right time in order to act upon controlling the process.

Finally, "alerts" can be dated as follows. The alert date may be the most recent date between the beginning date of the possible qualification context associated with the qualification of current seriousness, and the date of the qualification of magnitude and the place of the process-phenomenon (i.e. the QualifierAttributionDate). Therefore, the alert date is fixed in real time, according to the evolution of the process state, i.e. according to the changes in context qualification and according to the changes in magnitude and place qualification of the process-phenomenon.

The invention can be advantageously used for blast furnace control, thermal oven control, such as a cement oven, a glass oven, or a slab oven, as well as for an ongoing metal flow, lamination, or continuous metallic band lining installation; the invention is not limited to the general examples mentioned above, which are provided by way of illustration.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A control process procedure based on transmitted information transmitted from an environment of a process in order to address information to operators of said process to help the operators maintain or return said process to production objectives, comprising:

first defining process-phenomenon based on one or more evolution criteria, according to at least one of a date and position variable, of at least one magnitude of perception of a state of said process;

periodically acquiring the transmitted information, and elaborating with the transmitted information perception values used for first defining the process-phenomena;

describing the state and an evolution of the process by a succession of detected process-phenomena;

judging each detected process-phenomena according to a particular context which is described by other process-phenomena, to prepare a plurality of messages likely to be transmitted, and to classify said messages related to the process-phenomena in context of helping maintain or return said process to its production objectives; and addressing and sending to the operators selected messages of said plurality of messages related to the judged process-phenomena only when said selected messages are classified as helping maintain or return said process to its production objectives concerning said detected process-phenomena.

2. A control process procedure according to claim 1, wherein the description of the state and evolution of the process includes event time series, wherein a definition of said events includes one or more evolution criteria of at least one magnitude of perception, and each evolution criteria is assigned at least one of a date and a position, and wherein each event time series is formed by an ordered chain according to at least one of its date and position.

3. A control process procedure according to claim 1, wherein a previous definition of the process-phenomenon also includes types of event time series.

4. A control process procedure according to claim 2, wherein a previous definition of the process-phenomenon also includes types of event time series.

5. A control process procedure according to claim 1, wherein the definition of the process-phenomenon and events also includes at least one evolution criteria of a first derivation of at least one magnitude in relation to the at least one date and position variable, with the first derivative being a function of a variable.

6. A control process procedure according to claim 2, wherein the definition of the process-phenomenon and events also includes at least one evolution criteria of a first derivation of at least one magnitude in relation to the at least one date and position variable, with the first derivative being a function of a variable.

7. A control process procedure according to claim 3, wherein the definition of the process-phenomenon and events also includes at least one evolution criteria of a first derivation of at least one magnitude in relation to the at least one date and position variable, with the first derivative being a function of a variable.

8. A control process procedure according to claim 1,
   wherein values of the at least one magnitude or its first derivative are ordered according to said date and position variable to form a signal,
   wherein evolution criteria that deal with calculated parameters based on the signal, to be observed only in a predetermined interval of values of said variable, are an analysis scale, and
   wherein a definition for each of the evolution criteria involves classification of a calculated value for each parameter in which said evolution criteria deal with different predetermined sub-domains of values domain in the respective parameter, each sub-domain being defined by an upper and lower limit.

9. A control process procedure according to claim 1, wherein
   at least some of said evolution criteria are determined according to the production objectives of said process, and
   the production objectives are reevaluated during each acquisition period of said information, and said evolution criteria are updated accordingly.

10. A control process procedure according to claim 8, wherein
    at least some of said evolution criteria are determined according to the production objectives of said process, and
    the production objectives are reevaluated during each acquisition period of said information, and said evolution criteria are updated accordingly.

11. A procedure according to claim 10, wherein in order to determine said evolution criteria according to production objectives, the upper and lower limits are made variable depending on the production objectives.

12. A control process procedure according to claim 1, wherein said control process procedure controls a complex dynamic process.

13. A control process procedure according to claim 2, wherein said control process procedure controls a complex dynamic process.

14. A control process procedure according to claim 3, wherein said control process procedure controls a complex dynamic process.

15. A control process procedure according to claim 4, wherein said control process procedure controls a complex dynamic process.

16. A control process procedure according to claim 5, wherein said control process procedure controls a complex dynamic process.

17. A control process procedure according to claim 6, wherein said control process procedure controls a complex dynamic process.

18. A control process procedure according to claim 7, wherein said control process procedure controls a complex dynamic process.

19. A control process procedure according to claim 8, wherein said control process procedure controls a complex dynamic process.

20. A control process procedure according to claim 12, wherein said complex dynamic process is selected from the group consisting of blast furnace operations, thermal oven operations, and the installation of an ongoing metal flow, lamination, and continuous metallic band lining.

* * * * *